Sept. 3, 1957   L. M. SHAVER   2,805,100
GARDEN HOSE REEL CONSTRUCTION
Filed Nov. 22, 1954   3 Sheets-Sheet 1
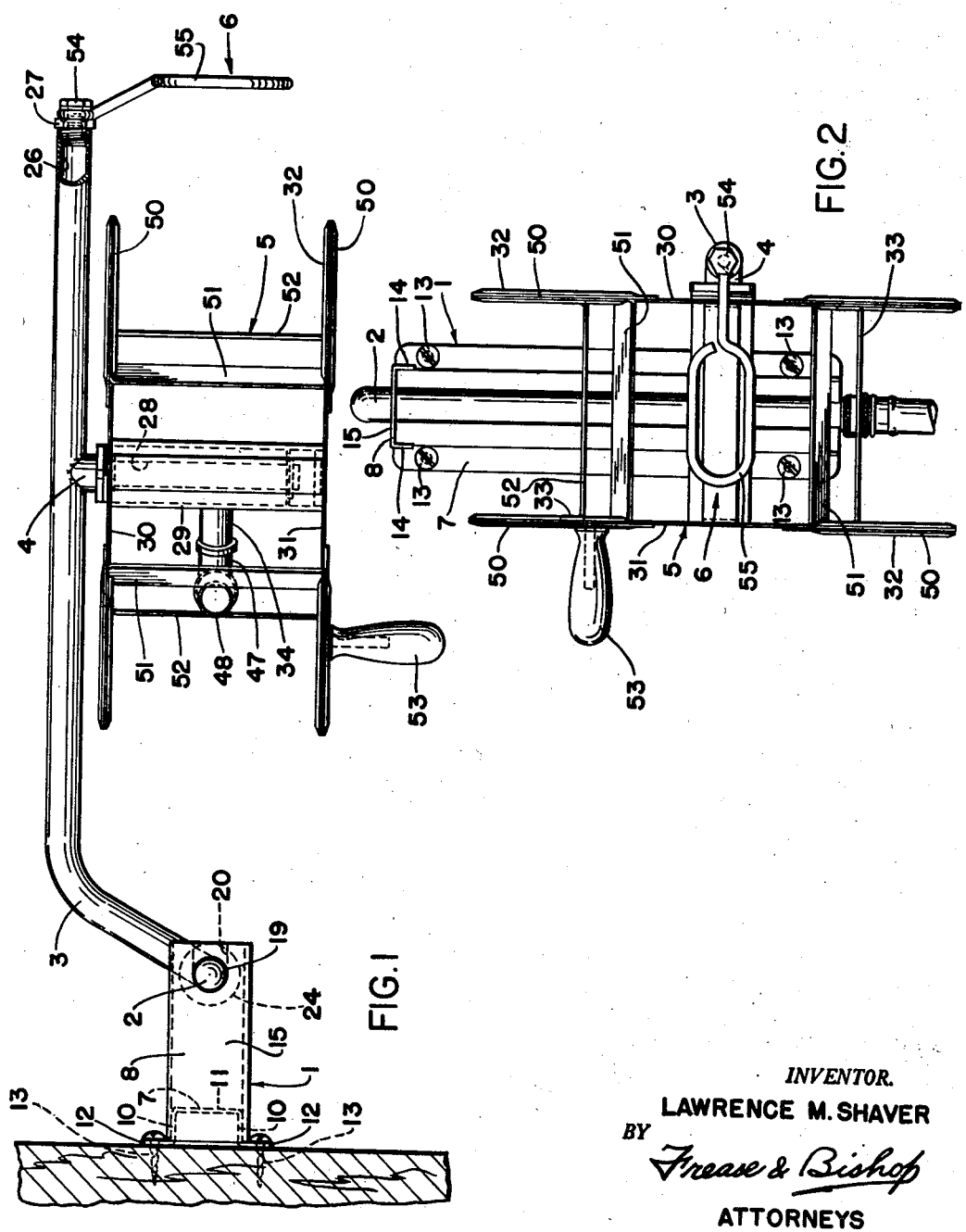
INVENTOR.
LAWRENCE M. SHAVER
BY
*Frease & Bishop*
ATTORNEYS Sept. 3, 1957 L. M. SHAVER 2,805,100
GARDEN HOSE REEL CONSTRUCTION
Filed Nov. 22, 1954 3 Sheets-Sheet 2
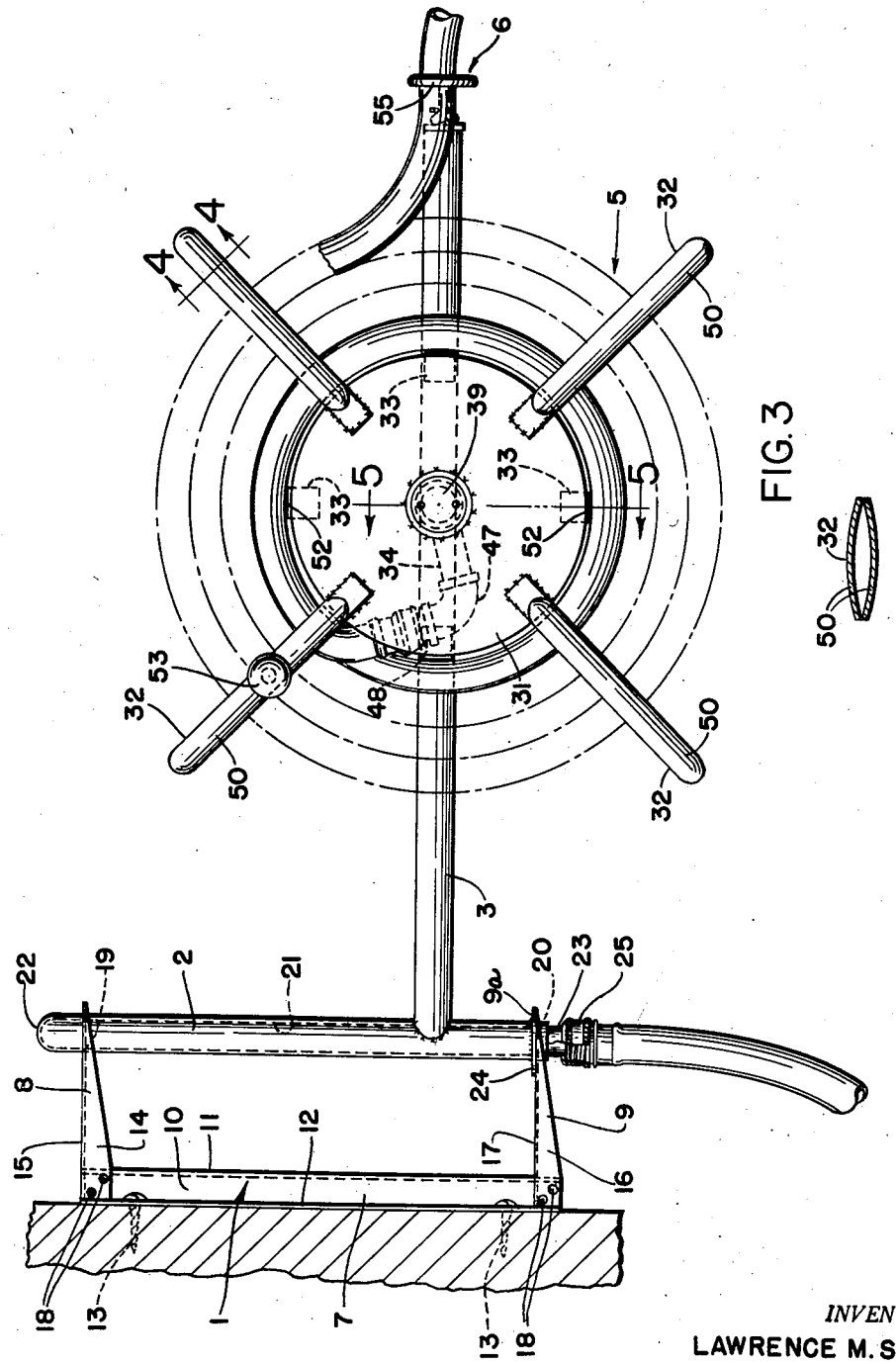
INVENTOR.
LAWRENCE M. SHAVER
BY
Frease & Bishop
ATTORNEYS

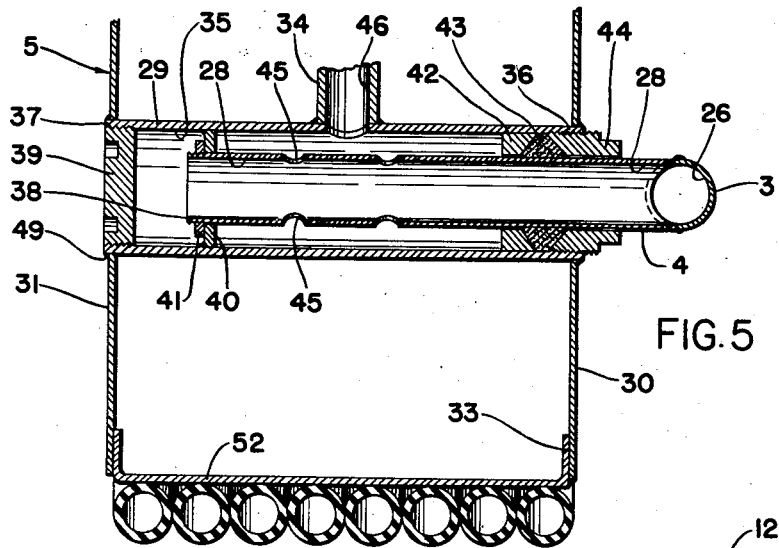
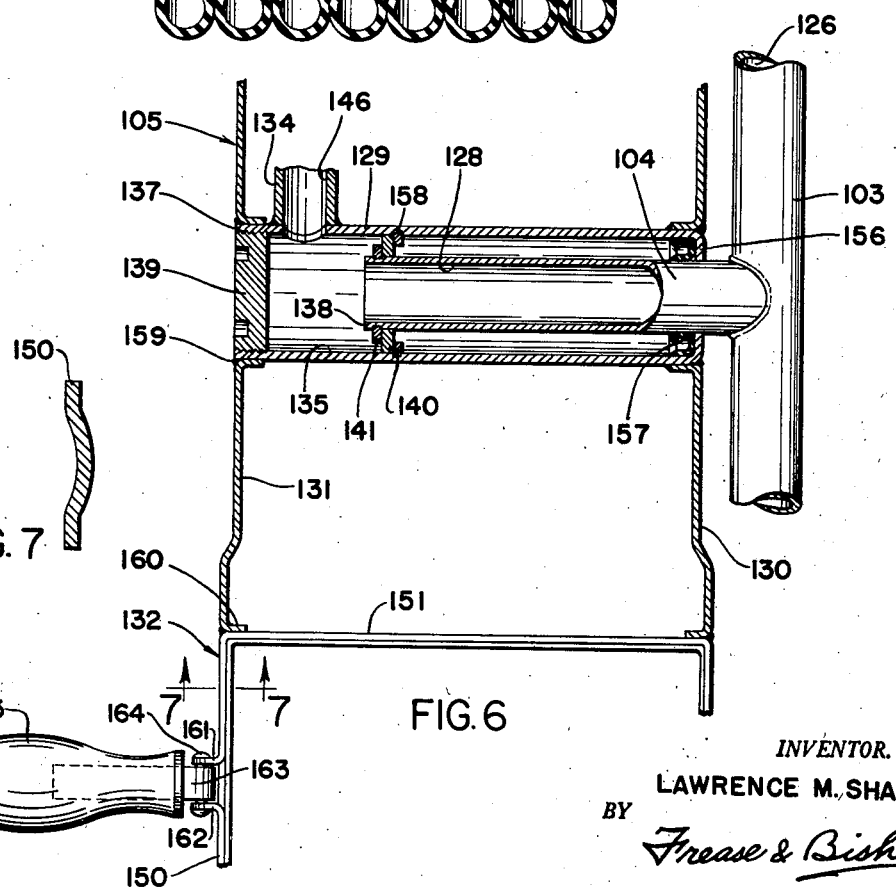

United States Patent Office 2,805,100
Patented Sept. 3, 1957

2,805,100

GARDEN HOSE REEL CONSTRUCTION

Lawrence M. Shaver, Alliance, Ohio

Application November 22, 1954, Serial No. 470,173

3 Claims. (Cl. 299—78)

My invention relates to improvements in garden hose reels and more specifically to a hose reel which may be mounted on a vertical surface such as the side of a house and on which a garden hose may be retained in coiled position, any length of which may be conveniently unwound therefrom for use.

Certain prior constructions of supporting means for hose reels have been arranged with passages formed therethrough so that the supporting means for the hose reel may be directly permanently mounted on a water outlet and a hose may be coupled in communication with the passages on the hose reel itself. Further, certain of these prior hose reel constructions have been arranged with pivoting means between the reel supporting arms and the water outlet and also have been constructed so that the reel is rotatable in relation to its supporting arms.

One of the principal disadvantages of these prior constructions is that they have been constructed so that they must be permanently attached to the water outlet, thereby placing undue stresses on the water outlet pipe due to the weight of the hose reel and its supporting arms. Further, with such permanent attachment, the water outlet may not be used for other purposes.

Another principal disadvantage of prior hose reel constructions is that expensive and complicated swivel means have been used between the water outlet and the hose reel supporting arms, and expensive and complicated packings have been used between the reel and its supporting arms to provide a water-tight connection therebetween, and yet provide for rotation as well as the communication of water between the supporting arms and the reel. Further, most prior constructions have used reels having large circular sides thereon, adding greatly to the weight of the construction.

It is therefore a general object of the present invention to provide a hose reel construction which overcomes the inherent difficulties in the prior constructions.

It is a primary object of the present invention to provide a hose reel construction which has its own mounting bracket so that the hose reel may be conveniently mounted on any vertical surface and thereby does not depend on any water outlet pipe for its support.

It is a further object of the present invention to provide a hose reel construction which is easily and conveniently attached to and detached from a water outlet and also from the hose reel mounting bracket so that the water outlet may be used for other purposes when the hose reel is not in use and so that the hose reel may be moved to another location as desired.

It is still a further object of the present invention to provide a hose reel construction which has a simple swivel device between its mounting bracket and supporting arms so that the hose reel may be directed in various directions away from the vertical surface upon which the mounting bracket thereof is mounted.

It is another object of the present invention to provide a hose reel construction which has passages formed therethrough between the supporting arms and the center portion of the reel with simple and efficient packing means between the supporting arms and the reel so that the reel is rotatable but yet the joint between the arms and reel is water tight.

Finally, it is an object of the present invention to provide a hose reel construction which functions conveniently and efficiently but yet is inexpensive to manufacture.

These and other objects are accomplished by the parts, constructions, arrangements, combinations and subcombinations comprising the present invention, the nature of which is set forth in the following general statement, preferred embodiments of which—illustrative of the best mode in which applicant has contemplated applying the principles—are set forth in the following description and illustrated in the accompanying drawings, and which are particularly and distinctly pointed out and set forth in the appended claims forming a part hereof.

In general terms, the hose reel construction of the present invention may be stated as including a mounting bracket for attachment to a preferably vertical surface, a preferably vertical support arm having a passage formed longitudinally therethrough and an open and a closed end with the vertical supporting arm pivotally and detachably mounted on the mounting bracket, coupling means connected to the vertical support arm open end so that a connecting hose may be connected to the coupling means and to a water outlet, a horizontal support arm having a passage formed longitudinally therethrough and an open and closed end with the open end of the horizontal arm connected to the vertical arm intermediate the ends of the vertical arm and with the passages in said arms in communication, a horizontal center support arm having a passage formed longitudinally therethrough and open ends with one of these open ends connected to the horizontal support arm intermediate the ends of the support arm with the passages of said arms in communication, a reel center arm having a passage formed longitudinally therethrough and an open and a closed end mounted telescoped over and spaced from the center support arm with the open end of the center support arm opposite from said one end spaced inwardly from the reel center arm closed end, pivotal support means between the open end of the center support arm opposite from said one end and the reel center arm spaced inwardly from the reel center arm closed end allowing rotational movement between the center support arm and the reel center arm, pivotal sealing means between the center support arm and the reel center arm open end allowing rotational movement therebetween, the center support arm preferably having spaced apertures formed transversely therein between the support means and the sealing means providing a communication between the passages in the center support arm and the reel support arm, spaced preferably circular side members mounted transversely on the reel center arm adjacent the ends thereof extending outwardly from the reel support arm and having preferably circular outer peripheries, preferably U-shaped primary retaining members having leg members and cross members mounted on the outer peripheries of the side members with the leg members extending radially from the side members at equally spaced intervals around the outer peripheries thereof and with the cross members spanning the distance between the side members, secondary retaining members mounted on the side members at equally spaced intervals around the outer peripheries thereof positioned between the primary retaining members and spanning the distance between the side members, hose coupling means having a passage formed therethrough connected to the reel center arm with the passage in the coupling means communicating with the passage in the reel center arm, a preferably ring-like hose guide means mounted on the closed end of the horizontal support arm, and handle means rotatably mounted preferably on one of the primary retaining members and extending horizontally therefrom.

By way of example, embodiments of the improved hose reel construction of the present invention are illustrated in the accompanying drawings forming a part hereof, wherein like numerals indicate similar parts throughout the several views, and in which:

Fig. 1 is a top plan view of the hose reel construction of the present invention;

Fig. 2, a front elevation of the hose reel construction of the present invention;

Fig. 3, a side elevation of the hose reel construction of the present invention;

Fig. 4, an enlarged sectional view looking in the direction of the arrows 4—4 in Fig. 3;

Fig. 5, an enlarged fragmentary sectional view looking in the direction of the arrows 5—5 in Fig. 3;

Fig. 6, an enlarged fragmentary sectional view similar to Fig. 5 showing a second embodiment of the hose reel construction of the present invention; and Fig. 7, an enlarged sectional view looking in the direction of the arrows 7—7 in Fig. 6.

Referring to Figs. 1, 2 and 3, the hose reel construction includes a mounting bracket generally indicated at 1, a vertical support arm 2, a horizontal support arm 3, a horizontal center support arm 4, a reel generally indicated at 5 and a hose guide generally indicated at 6.

The mounting bracket, generally indicated at 1, includes a vertical mounting plate 7 and horizontal arms 8 and 9. Plate 7, in cross-section, as shown in dotted lines in Fig. 1, is preferably channel shaped having leg portions 10, a connecting portion 11 and outwardly depending flanges 12. Flanges 12 have holes formed therein at the upper and lower ends thereof to receive mounting screws 13.

Horizontal arms 8 and 9 are also preferably channel shaped, as shown in Fig. 2, with arm 8 having leg portions 14 and a connecting portion 15, and arm 9 having leg portions 16 and a connecting portion 17. Arm 8 is mounted at the upper end of the mounting plate 7 with the connecting portion 15 abutting the upper end of the mounting plate 7 and the leg portions 14 abutting the outer sides of the leg portions 10 of plate 7, as shown.

Arm 9 is mounted at the lower end of plate 7 with the connecting portion 17 terminating at the outer side of connecting portion 11 of plate 7, and with leg portion 16 of arm 9 extending beyond the connecting portion 17 and abutting the leg portions 10 of plate 7. Leg portions 14 and 16 of arms 8 and 9 respectively, are fixedly secured to the leg portions 10 of plate 7 by means of preferably spot welding, as at 18.

The leg portions 14 and 16 of arms 8 and 9 respectively, preferably decrease in width from the plate 7 outwardly and terminate at points at the outermost ends of arms 8 and 9. Mounting holes 19 and 20 are formed through the connecting portions 15 and 17 of arms 8 and 9 respectively, spaced from the outer ends thereof.

The outermost end of arm 9 is curved upwardly, as shown in Fig. 3 at 9a for a purpose to be hereinafter described. Also, while hole 19 is formed preferably circular, hole 20 is slotted outwardly to the end of arm 9, as shown in dotted lines in Fig. 1, to a width equal to or greater than the diameter of hole 20.

Preferably circular tubular vertical support arm 2 is received through the mounting holes 19 and 20 and extends a distance above arm 8 and below arm 9. Arm 2 has a passage 21 formed longitudinally therethrough with its upper end closed, as at 22 and its lower end open, as at 23.

Washer 24 surrounds and is affixed to vertical support arm 2 and abuts the upper side of connecting portion 17 of horizontal arm 9. Also, turned up or curled portion 9a of arm 9 abuts the outer edge of washer 24, as shown. Coupling 25 is fixedly secured in the lower open end of vertical arm 2.

Thus, by moving vertical arm 2 a short distance upwardly until the washer 24 is above the curled or turned up portion 9a of arm 9, the lower end of the arm 2 may be moved outwardly through the slotted portion of hole 20, and thereafter the arm 2 may be moved downwardly to disengage the upper closed end 22 from the hole 19 in arm 8. In this way, vertical arm 2 may be selectively assembled or disassembled from the mounting bracket 1.

Horizontal support arm 3 is preferably circular tubular having a passage 26 formed longitudinally therethrough. Arm 3 is fixedly secured to arm 2 intermediate the ends of arm 2 with the passage 26 in arm 3 in communication with the passage 21 in arm 2. In top view, as shown in Fig. 1, arm 3 is formed preferably substantially L-shape and is closed at its outer end by the plug 27, which plug is threadably received therein, as shown.

Horizontal center support arm 4 is also preferably circular tubular having a passage 28 formed longitudinally therethrough. Center arm 4 is fixedly secured to horizontal arm 3 intermediate the ends of arm 3 and spaced inwardly from the closed end thereof, so that the passage 28 in arm 4 is in communication with the passage 26 in arm 3.

The reel, generally indicated at 5, includes a reel center arm 29, side plates 30 and 31, primary retaining members 32, secondary retaining members 33 and a hose coupling pipe 34, as shown in Figs. 1 through 5.

As best seen in Fig. 5, the reel center arm or manifold 29 is preferably tubular having the passage 35 formed longitudinally therethrough, and also having an open end 36 and a closed end 37. Horizontal center arm 4 is telescoped within reel center arm 29 so that the open end 38 of arm 4 is spaced from the closed end 37 of arm 29. Plug 39 serves to close the end 37 of center arm 29.

The cross member or support washer 40 is fixedly secured within the passage 35 of arm 29 spaced inwardly from the closed end 37, as shown in Fig. 5. The open end 38 of center support arm 4 is received through support washer 40 and is secured so positioned by the nut 41, threadably received over the end 38 of center support arm 4.

Packing ring 42 is fixedly secured within the passage 35 in the reel center arm 29 spaced inwardly from the open end 36 of arm 29 and surrounding the center support arm 4, as shown. Packing material 43 is positioned outwardly of packing ring 42 toward the open end 36 of arm 29 and also surrounding the center support arm 4. The packing plug 44 is threadably received in the open end 36 of the reel center arm 29 and abuts the outer side of the packing material 43 and also surrounds the center support arm 4.

The outer side of packing ring 42 and the inner side of packing plug 44 are preferably angled outwardly, as shown in Fig. 5 so that as the plug 44 is brought to bear against the packing material 43, the packing material 43 will be forced inwardly against the outer side of the center support arm 4, thereby forming a water-tight seal but still permitting rotation between the packing material 43 and the center support arm 4. Packing material 43 may be of any usual composition used for sealing watertight joints.

Thus, the reel center arm 29 is rotatably mounted on the center support arm 4 and is retained thereon by the support washer 40, nut 41 and the packing ring 42, packing material 43 and packing plug 44. At the same time, chamber 35 in the reel center arm 29 is formed water tight by the plug 39 in the closed end 37 and the packing means including the packing material 43 in the open end 36.

Spaced apertures 45 are formed in the center support arm 4 between the support washer 40 and the packing means in reel center arm 29, thereby forming a communication between the passage 28 in the center support arm 4 and the passage 35 in the reel center arm 29 between the support washer 40 and the packing means of arm 29. A hose coupling pipe 34 preferably tubular and having the passage 46 formed therethrough is fixedly secured to the reel center arm 29 extending preferably perpendicular to the axis thereof, with the passage 35 of arm 29 in communication with the passage 46 in pipe 34.

Pipe 34 is preferably positioned intermediate the ends of reel center arm 29 and between the support washer 40 and the packing means 42—43—44 of reel center arm 29. This pipe 34 may also include an elbow 47 and a threaded nipple 48, as shown in Figs. 1, 2 and 3, so that one end of a garden hose may be connected thereto.

Spaced side plates 30 and 31 having preferably circular outer peripheries are affixed to the reel center arm 29 adjacent the ends thereof, with the side plate 30 positioned adjacent the open end 36 and the side plate 31 positioned adjacent the closed end 37. Plates 30 and 31 may be fixedly secured to arm 29 by welding, as at 49.

Primary retaining members 32 are secured to the outer circular periphery of plates 30 and 31 at preferably equally spaced intervals around the periphery of plates 30 and 31 and extending radially outwardly thereof. Retaining members 32 are formed preferably U-shaped and include the preferably double thickness leg members 50 and the cross members 51.

Primary retaining members 32 are preferably each formed of a single strip of metal so that the leg members 50 and the cross members 51 are integral. As an illustration and as best seen in Figs. 1 and 2, a retaining member 32 may start at its point of attachment to the side plate 30 and extend radially outwardly for a distance and thence, double back on itself and extend radially inwardly to the outer periphery of the side plate 30, forming one of the leg members 50 of double thickness, thence across to the outer periphery of side plate 31 to form the cross member 51, and thence extend radially outwardly for a distance after which doubling back on itself radially inwardly to its point of attachment to the side plate 31 to form the other leg member 50. Also, the leg members 50 may be bowed transversely thereof forming stiffening grooves longitudinally therein, as shown.

The secondary retaining members 33 are also positioned equally spaced around the outer peripheries of plates 30 and 31 being equally spaced between the primary retaining members 32. As best seen in Fig. 5, secondary members 33 merely include a cross member 52 with the ends thereof bent inwardly to be attached to the plates 30 and 31.

A handle 53 may be rotatably mounted on one of the leg members 50 of the primary retaining members 32 so that it extends parallel to the axis of the circular side plate 31. Thus, handle 53 may be grasped to rotate the reel, generally indicated at 5, in reference to the center support arm 4.

Also, a hose guide, generally indicated at 6, may be mounted at the closed end of support arm 3 by preferably the screw 54, threadably received in the plug 27. Hose guide 6 is preferably formed of wire and extends away from the support arm 3 and then is formed into a ring 55, as best seen in Figs. 1 and 2.

Thus, as shown in Fig. 3, a length of coupling hose may be connected to the coupling 25 in the open end of the vertical support arm 2 with the other end of this hose being connected to a water outlet, not shown. One end of a garden hose may then be connected to the hose coupling pipe 34 connected to the reel center arm 29 and by rotating the reel 5 in reference to the center support arm 4 by means of the handle 53, the garden hose may be coiled around the primary and secondary retaining members 32 and 33.

When it is desired to use the hose, the hose is threaded through the hose guide 6 and pulled outwardly, causing the reel 5 to rotate and uncoil the hose. The water supply may then be turned on with the water flowing through the passage 31 in arm 2, passage 26 in arm 3, passage 28 in arm 4, apertures 45 in arm 4 and the passage 46 in pipe 34 into the garden hose. After use, the garden hose may then be recoiled by again rotating reel 5, thereby providing convenient storage of the hose.

Since, as before described, vertical support arm 2 is conveniently detached from the mounting bracket 1, by merely moving the vertical arm 2 upwardly until the washer 24 is above the curled end 9a on horizontal arm 9, mounting brackets 1 may be conveniently placed adjacent water outlets at various points around the outside of a house or building or in the basements thereof. Thus, the hose reel having a hose coiled thereon, may be conveniently moved to any desired point of use. Also, since the vertical support arm 2 is rotatable in reference to the mounting bracket 1, while in use, the support arm 3 and thus, the hose reel 5 may be directed in any direction away from the supporting surface upon which the mounting bracket 1 is secured.

In a second embodiment of the present invention shown in Fig. 6, the horizontal support arm is indicated at 103, the horizontal center support arm at 104, the reel at 105 and the cross member or support washer at 140. In this case, the arm 103 is provided with a passage 126 and the arm 104 with a passage 128, but arm 104 is formed without apertures so that water passing through arms 103 and 104 must flow out of the open end of arm 104 into the passage 135 in the reel center arm 129.

The open end of the arm 104 is supported, similar to before, by the support washer 140. In this embodiment, however, the support washer 140 is not affixed to the reel center arm 129, but rather is floating and retained properly positioned by the snap rings 141 and 158. Snap ring 141 replaces the nut and is engaged with the center support arm 104 spaced inwardly from the open end 138 and adjacent one side of washer 140, as was the nut used in the first embodiment. The snap ring 158 is positioned within the passage 135 of the reel center arm 129 and is engaged with arm 129 adjacent the side of washer 140 opposite from the snap ring 141.

The open end of the reel center arm 129 is, in this case, formed with an inwardly depending flange 156 extending inwardly and slightly spaced from the outer side of the arm 104. A preferably resilient rubber or plastic U-ring 157 is positioned abutting the inner side of the flange 156, as shown, and serves as a water-tight packing between the arm 104 and the arm 129, but yet allowing rotational movement therebetween.

Also, the hose coupling pipe 134, having the passage 146 formed therethrough, is connected to the reel center arm 129 between the floating support washer or cross member 140 of arm 104, and the plug 139 forming the closed end 137 of reel center arm 129. Thus, in this case, water may flow through passage 126 in arm 103, passage 128 in arm 104 and into passage 135 in arm 129 between the cross member or support washer 140 and the closed end 137 of arm 129, and then may flow through passage 146 in pipe 134 into a hose on reel 105.

Also in the second embodiment, the circular side plates 130 and 131 are flanged inwardly, as shown in Fig. 6, at both their points of connection to the reel center arm 129 and the retaining members 132, as shown at 159 and 160. Further, the retaining members 132 are formed of a single thickness U-shaped piece so that both leg members 150 and the cross members 151 are of single thickness. For stiffness, a continuous longitudinally extending groove is formed in leg members 150 and cross members 151, a cross section of which is shown in Fig. 7, A handle 153, similar to that previously shown, is rotatably mounted to one of the leg members 150. Preferably, as shown in Fig. 6, the leg member 150 is formed into flange portions 161 and 162 and the support member 163 rotatably mounting handle 153 is pivotally attached to flanges 161 and 162 by means of the pin 164.

Thus, handle 153 is not only rotatably attached to leg member 150 but is also pivotally attached thereto, so that handle 153 may be selectively folded against the side of reel 105, or positioned extending outwardly away from the side of reel 105 for use. By pivotally mounting handle 153 so that it may be folded flush with the side of reel 105, the reel construction may be swung on its mounting bracket so that the side of the reel 105 containing the handle 153 is flush against the side of a building or the like and it is not necessary for the reel to be spaced away from the building the distance equal to the length of the handle 153.

Thus, there is provided a hose reel construction which overcomes the inherent difficulties in the prior constructions; which has its own mounting bracket so that the hose reel may be conveniently mounted on any vertical surface and thereby does not depend on any water outlet pipe for its support; which is easily and conveniently attached to or detached from a water outlet and also from the hose reel mounting bracket so that the water outlet may be used for other purposes when the hose reel is not in use, and so that the hose reel may be moved to another location, as desired; which has a simple swivel device between its mounting bracket and supporting arms so that the hose reel may be directed in various directions away from the vertical surface upon which the mounting bracket thereof is mounted; which has passages formed therethrough between the supporting arms and the center portion of the reel with simple and efficient packing means between the supporting arms and the reel so that the reel is rotatable but yet the joint between the arms and reel is water tight; and which functions conveniently and efficiently, but yet is inexpensive to manufacture.

In the foregoing description, certain terms have been used for brevity, clearness and understanding, but no unnecessary limitations are to be implied therefrom, because such words are used for descriptive purposes therein, and are intended to be broadly construed.

Moreover, the embodiments of the improved construction illustrated and described herein are by way of example, and the scope of the present invention is not limited to the exact details of construction shown.

Having now described the invention, the construction, the operation and use of preferred embodiments thereof, and the advantageous new and useful results obtained thereby; the new and useful construction and reasonable mechanical equivalents thereof obvious to those skilled in the art are set forth in the appended claims.

I claim:

1. Hose reel construction including a mounting bracket, support arm means having a passage formed longitudinally therethrough and having a hollow generally cylindrical reel mounting portion, the support arm means being mounted on the mounting bracket, a hose storage reel having a hollow generally cylindrical center member, the center member having open and closed ends, a cross member mounted in the center member intermediate the ends thereof and having a circular hole formed therein, the reel mounting portion being telescoped within the open end of the reel center member with said reel mounting portion being received in the hole in the cross member, the reel center member being rotatable in reference to the reel mounting portion and the passages of the reel center member and support arm means being in communication, sealing means positioned between the open end of the reel center member and the reel mounting portion providing a liquid-tight seal therebetween but permitting rotation of the reel in reference to the support arm means, and hose coupling means having a passage formed therethrough connected to the reel center member with passages in said coupling means and center member in communication.

2. Hose reel construction as defined in claim 1 in which the reel mounting portion has spaced apertures formed therein between the sealing means and the cross member providing the communication between the passages in the support arm means and the reel center member; and in which the hose coupling means is connected to the reel center member between the sealing means and the cross member.

3. Hose reel construction as defined in claim 1 in which the reel mounting portion has an open end providing the communication between the passage in the support arm means and the passage in the reel center member at a point between the center member closed end and the cross member; and in which the hose coupling means is connected to the reel center member between the reel center member closed end and the cross member.

References Cited in the file of this patent

UNITED STATES PATENTS

| | | |
|---|---|---|
| 904,380 | Vader | Nov. 17, 1908 |
| 965,648 | Nace | July 26, 1910 |
| 1,329,442 | Thomas | Feb. 3, 1920 |
| 1,354,504 | Montgomery et al. | Oct. 5, 1920 |
| 1,920,421 | Mills | Aug. 1, 1933 |
| 2,034,480 | Mossberg | Mar. 17, 1936 |
| 2,530,114 | Bugg | Nov. 14, 1950 |
| 2,609,231 | Crawford | Sept. 2, 1952 |